US010584587B2

(12) United States Patent
McLean

(10) Patent No.: US 10,584,587 B2
(45) Date of Patent: Mar. 10, 2020

(54) TANGENTIAL FORCE INTERNAL COMBUSTION ENGINE

(71) Applicant: Hugh McLean, Lebanon, IN (US)

(72) Inventor: Hugh McLean, Lebanon, IN (US)

(\*) Notice: Subject to any disclaimer, the term of this patent is extended or adjusted under 35 U.S.C. 154(b) by 174 days.

(21) Appl. No.: 15/865,707

(22) Filed: Jan. 9, 2018

(65) Prior Publication Data

US 2019/0211678 A1    Jul. 11, 2019

(51) Int. Cl.
| | |
|---|---|
| F01C 1/063 | (2006.01) |
| F16D 41/08 | (2006.01) |
| F01C 19/00 | (2006.01) |
| F16D 43/208 | (2006.01) |
| F16D 41/066 | (2006.01) |
| F02B 75/02 | (2006.01) |
| F01C 21/08 | (2006.01) |
| F01C 1/077 | (2006.01) |
| F02B 53/02 | (2006.01) |
| F02B 53/00 | (2006.01) |

(52) U.S. Cl.
CPC ............. *F01C 1/063* (2013.01); *F01C 1/077* (2013.01); *F01C 19/00* (2013.01); *F01C 21/08* (2013.01); *F02B 75/021* (2013.01); *F16D 41/066* (2013.01); *F16D 41/088* (2013.01); *F16D 43/208* (2013.01); *F02B 53/02* (2013.01); *F02B 2053/005* (2013.01); *Y02T 10/17* (2013.01)

(58) Field of Classification Search
CPC ........ F01C 1/063; F01C 19/00; F02B 75/021; F02B 53/02; F02B 2053/005; F16D 41/066; F16D 43/208; F16D 41/088; Y02T 10/17
See application file for complete search history.

(56) References Cited

U.S. PATENT DOCUMENTS

| | | | | |
|---|---|---|---|---|
| 3,595,014 | A | * | 7/1971 | McMaster ............... F01C 1/063 60/581 |
| 4,683,852 | A | | 8/1987 | Kypreos-Pantozis |
| 5,220,893 | A | * | 6/1993 | Costa ..................... F02B 53/02 123/225 |
| 5,233,954 | A | * | 8/1993 | Chomyszak ............ F01C 3/025 123/221 |
| 5,400,754 | A | | 3/1995 | Blanco Palacios |
| 5,979,380 | A | * | 11/1999 | Nakadouzono ....... F01L 1/3442 123/90.17 |
| 6,024,061 | A | * | 2/2000 | Adachi ................. F01L 1/3442 123/90.17 |

(Continued)

*Primary Examiner* — Michael C Zarroli

(57) ABSTRACT

An internal combustion engine utilizes the four-cycle process. Gas working chambers are formed using portions of a toroid, two opposing pistons, and seals at the inner gap. A cycle occur over 360 degrees of the toroid with gas ports appropriately placed. One Power Vane (PV) and one Reaction Vane (RV) connect to a central shaft with one piston assembly attached to each end of each vane. The PV produces driving torque on a central shaft through an Overrunning Clutch System (OCS). At specific angles and for controlled durations the PV and RV are slowed, stopped, held to the housing, and then accelerated and coupled to the shaft. Vane movement is controlled by gears, cam ramps, and pin mechanisms operated via multiple, independent but time-coordinated systems. The power vane has no controlled acceleration as combustion forces couple this vane to the shaft via the OCS.

4 Claims, 7 Drawing Sheets

(56) References Cited

U.S. PATENT DOCUMENTS

| | | | | |
|---|---|---|---|---|
| 6,036,462 A | * | 3/2000 | Mallen | F01C 1/32 418/150 |
| 7,757,658 B2 | * | 7/2010 | Nagata | F01C 1/32 123/242 |
| 8,056,527 B2 | * | 11/2011 | De Oliveira | F01C 1/3446 123/204 |
| 8,360,759 B2 | * | 1/2013 | Pekrul | F01C 1/3445 418/184 |
| 2001/0028853 A1 | * | 10/2001 | Hoyt | F01C 9/002 417/355 |

* cited by examiner

TANGENTIAL FORCE INTERNAL COMBUSTION ENGINE

BACKGROUND OF THE INVENTION

Internal combustion engines have had over 100 years of development and are clean, reliable, power dense where desired, and fuel efficient where desired. Piston engines have dominated automotive applications with gasoline engines being used more than diesel engines in the US. Automotive engines are undergoing rapid development to increase fuel efficiency to meet regulations. Longer ratios of the stroke relative to the bore, turbocharging, and use of the Miller or Atkinison cycles are technologies promoting efficiency. The goal of this invention is a more fuel efficient engine with inherently good pollution control properties.

Diesel engines are generally more fuel efficient than gasoline but are losing favor in automotive applications due to extra pollution control technology. Two-cycle engines have not been significant in automotive applications but have a long history of use in truck, locomotive, and large marine applications where their fuel efficiency had a good history. Pollution restrictions have particularly hurt fuel efficiency of these two cycle diesel engines and new designs now use four cycle engines. Turbocharging was critical to two-cycle diesel engine efficiency. The ElectroMotive Diesel Div. of Caterpillar (formerly ElectroMotive Div. GM) two-cycle locomotive engine designed an overrunning clutch mechanism which allowed a single turbocharger to operate coupled to the crankshaft at light loads and then uncouple from the crankshaft and operate much higher rpm once exhaust gas pressure built sufficiently. When gas pressure created more torque from the turbine than that applied by the shaft the overrunning clutch roller elements were moved to clearance positions and thus allowed the turbine to freewheel on the shaft. This EMD design of this successful overrunning clutch was essentially that of Dietrich Reister Herzgenaurach and Wolfgang Pfluenger in U.S. Pat. No. 3,537,555 (ref. 1). A similar overrunning clutch system, with an additional feature, is perhaps the most important mechanism for the concept of the Tangential Force Internal Combustion Engine (TFICE) of this patent.

Natural gas, propane, and landfill gas engines have been used in various applications for highly targeted reasons. Hydrogen is being used as a fuel for novel power sources in autos where pollution control laws are strictest. Battery fueled autos are gaining in numbers as are hybrid versions utilizing highly efficient gasoline engines. The Wankel engine is a rotary engine with no pistons or connecting rods and few moving parts. It has been successfully used in niche sports cars where light weight and good power density are beneficial (ref. 2). Emission challenges and low fuel efficiency kept this as a niche engine.

The jet engine was first used in airplanes late in WWII with the Messerschmitt ME262 in 1944. Frank Whittle of England was granted a patent for his turbo-jet engine in 1932. (ref 3). Today's gas turbine engines can have good fuel efficiency but at the high cost of multiple compressor and turbine stages. Gas turbine engines are used where weight and power density are prime concerns.

The present invention is hoped to have potentially significantly higher fuel efficiency than piston engines. The present invention couples force from the power cycle more directly to the output shaft as useable torque. A power vane is attached to the shaft through an overrunning clutch mechanism which allows 100% of the combustion force to be transmitted as usable torque to the shaft for essentially the entire duration of this power cycle. A piston engine design transmits only a fraction of the available connecting rod force into shaft torque because the force vectors need to be resolved to that which is tangential to the crankshaft. Such force vectoring is required at both the piston pin and crankpin. The remaining non-tangential load vectors lead to inefficiencies and unwanted localized forces which produce no desirable effect.

Piston thrust loading and high compressive forces directly into the crankshaft bearings are two unwanted but unavoidable forces in piston engines. The present invention eliminates such unwanted force vectors. Piston thrust loads are sometimes manifested as piston skirt seizures. The fact that the largest diesel piston engines use crossheads to avoid potential piston issues from such thrust loading recognizes this situation. The piston assembly of the TFICE engine will have complexity of its own as it will need to locally match the overall—toroid chamber shape and carry multiple sealing rings. But TFICE "pistons" operate on vanes that transfer torque more directly to the shaft through a symmetrical OCS mechanism mentioned earlier. Said OCS mechanism clutches a multitude of symmetrically spaced roller elements between the vane (or an OCS "housing" securely fitted into the vane) and the shaft. This clutching action transmits torque directly instead of producing a compressive force onto an offset crankpin. Certainly the OCS produces highly localized compressive forces (creating contact stress on and around roller elements) but this is the mechanism for creating moments directly into the shaft. This clutching mechanism is an efficient means to create pure moments and is thought to be much more efficient at converting combustion forces into shaft torque than crankpin offsets and resolving forces.

Other unwanted forces in modern reciprocating piston engines produce crankshaft orbit as various reciprocating weights, crankpin throw angles, and various levels of balance weights produce sometimes unexpected forces on main and conrod bearings. Unit loading is typically high on conrod bearings, especially for the most highly fuel efficient diesel engines. Proper sizing and material choices are needed to avoid seizure or early wear out. Conrod bearings are commonly replaced at half the life of main bearings. The need to change crankshaft bearing increases with increased power and fuel efficiency and so designs are made for wear element components to be replaced instead of more expensive components. Similarly this TFICE invention would ultimately need roller elements and other local wear components designed-in to avoid replacement of higher cost components.

The Wankel rotary engine uses an eccentric shaft and, like the piston engine, combustion forces do not vector directly to the shaft as torque. More combustion force is lost in Wankel engines compared to the TFICE engine being proposed. This engine is also thought to be inherently inferior to the piston engine in regards to fuel efficiency.

Jet engines or turbojet engines have combustion gas flow paths that efficiently resolve vectors into shaft torque via controlled gas flow paths. However the most basic gas turbine engine does not have a simple, fully enclosed combustion process. Certainly modern jet engines are powerful and even fuel efficient with modern design utilizing multiple compressor and turbine stages and ever higher local temperatures. These design features precludes the use of fuel efficient gas turbines from any cost sensitive application.

Piston engines are fuel efficient via achieving relatively high combustion pressures that are contained in a fully enclosed combustion chamber. A reaction component to the force produced on the crankpin in a piston engine is the cylinder head and this fully encloses the combustion process. As the head is fixed via bolts to the block it thus serves as the torque reaction component. The torque reaction in the present invention is the reaction vane as it is pinned to the engine housing. In this manner the combustion torque has an effective reaction torque for mechanical equilibrium.

No forces in the TFICE invention create piston thrust forces or compressive forces into the support bearings. Pure tension or compression is not present in the vanes as combustion forces are tangential to the shaft and there is no reciprocating motion. Essentially, the vanes are either directly connected to the output shaft or the vane rides on roller elements on the shaft. Roller element bearings are envisioned in shaft support roles as these bearings have essentially no compressive or axial forces to contend with. Roller element bearings are another source of fuel efficiency compare to piston engines.

It is acknowledged that the design shown by example herein provides just 75 degrees of power duration cycle compared to the approximately 180 degrees in piston engines. Increasing this duration is possible with different timing and shaft gear ratios. However the TFICE invention is thought to provide much more useful work during the power duration such that small "cylinder (i.e. toroidal chamber) displacements" will produce relatively large torques.

The most pressing design challenge with the present invention is combustion sealing as the Power Vane leaves a growing inside gap as it rotates around the toroid. The invention shown herein explains basic operating principles and only a rudimentary combustion seal is proposed. The topic of combustion sealing will need to be addressed in more detail in the future. The seal shown herein is a series of sealing elements but it seems possible to use a continuous sealing assembly that would fit inside vanes that are locally hollow at this seal. If a continuous seal were developed then efficiency benefits could further develop as the use of longer power durations, beyond 180 degrees even could be envisioned.

BRIEF SUMMARY OF INVENTION

The Tangential Force Internal Combustion Engine (TFICE) is imagined as a Power Vane (PV) that applies torque directly to the shaft through an Overrunning Clutch System (OCS). This OCS is a key mechanism needed in this engine as it allows nearly instantaneous torque application from the Power Vane (PV) to the shaft and simultaneously allows the Reaction Vane (RV) to freewheel relative to the shaft. This invention utilizes the common four cycle internal combustion process, i.e. an Otto Cycle. The invention forms two gas working chambers each consisting of a portion of a toroid which is closed by two piston assemblies, each piston assembly having multiple ring type seals on each end, combined with seal elements that create an inside seal as one vane moves away or toward the other. Intake, compression, power, and exhaust cycles are spaced over the 360 degree housing toroid in the present manifestation. Vanes move 360 degrees for a complete cycle while the shaft rotates more. The amount of shaft rotation for a complete cycle depends on key design features and an equation is developed herein that relates a complete cycle of the shaft to the 360 cycle of the Reaction Vane within the housing.

No conventional pistons or connecting rods are utilized in the present invention. In place of these components are piston assemblies attached to vanes. One Power Vane (PV) and one Reaction Vane (RV) with the ends of these vanes slip fitted to piston assemblies having shapes that are overall form fitting to the toroid portion. The vanes extend across the shaft to produce symmetrical vanes and piston assemblies across the centerline. The PV produces torque on a central shaft through the OCS mechanism when combustion occurs when either piston assembly set has compressed the air-fuel mixture and the spark plug has fired. Power is taken at the exit end of the shaft in typical fashion.

At specific angles and for controlled angular durations the PV and VN are slowed, stopped, held to the housing, and then accelerated to most nearly match speed and then re-couple with the shaft. Deceleration and acceleration of a vane is controlled by a gear, ramp, and pin mechanism shown herein. Each vane has a radial slot on one end which allows for the insertion of a pin in order to either accelerate or decelerate the vane. Vane hold mechanisms rely on pinning each vane to the housing for durations defined by a ramp in the timing gear that acts on the end of the pin. The power vane has no controlled acceleration; combustion serves to couple this vane to the shaft through the overrunning clutch system of this invention.

DETAILED DESCRIPTION OF THE INVENTION

The present invention is named a Tangential Force Internal Combustion Engine (TFICE) and it utilizes the typical four Otto cycles over the 360 degrees of a toroid. Typical compression cycles of approximately 9:1 are utilized and the power duration is 90 degrees shaft or less in the present manifestation. Intake and exhaust flows into gas working chambers are thru ports that are covered and uncovered by piston assembly motions. A one way flow valve may be used at each port to prevent wrong gases from entering the wrong port.

Figure 1:
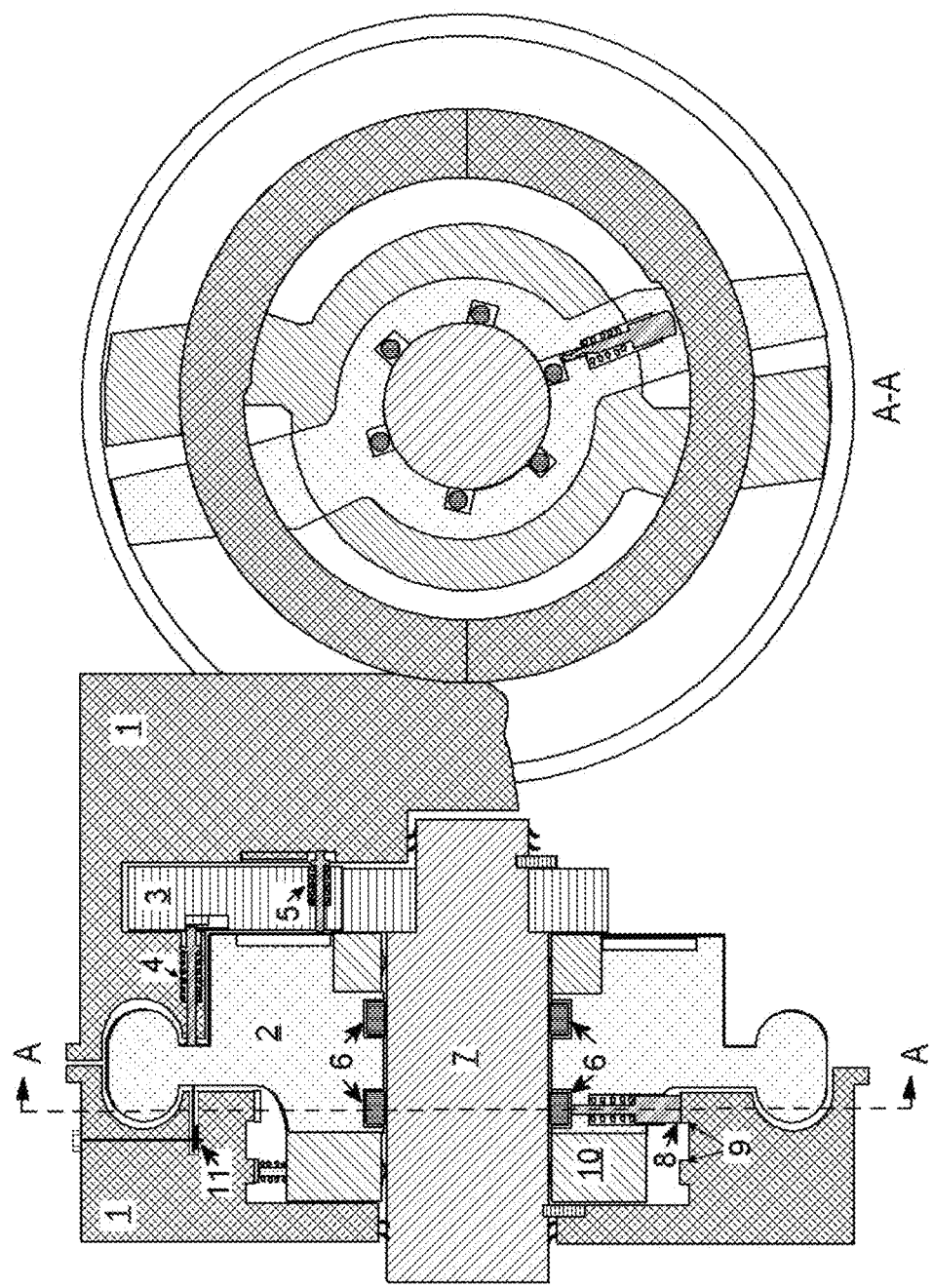
FIG. 1 shows a longitudinal section and a cross section of the invention.
Figure 2:
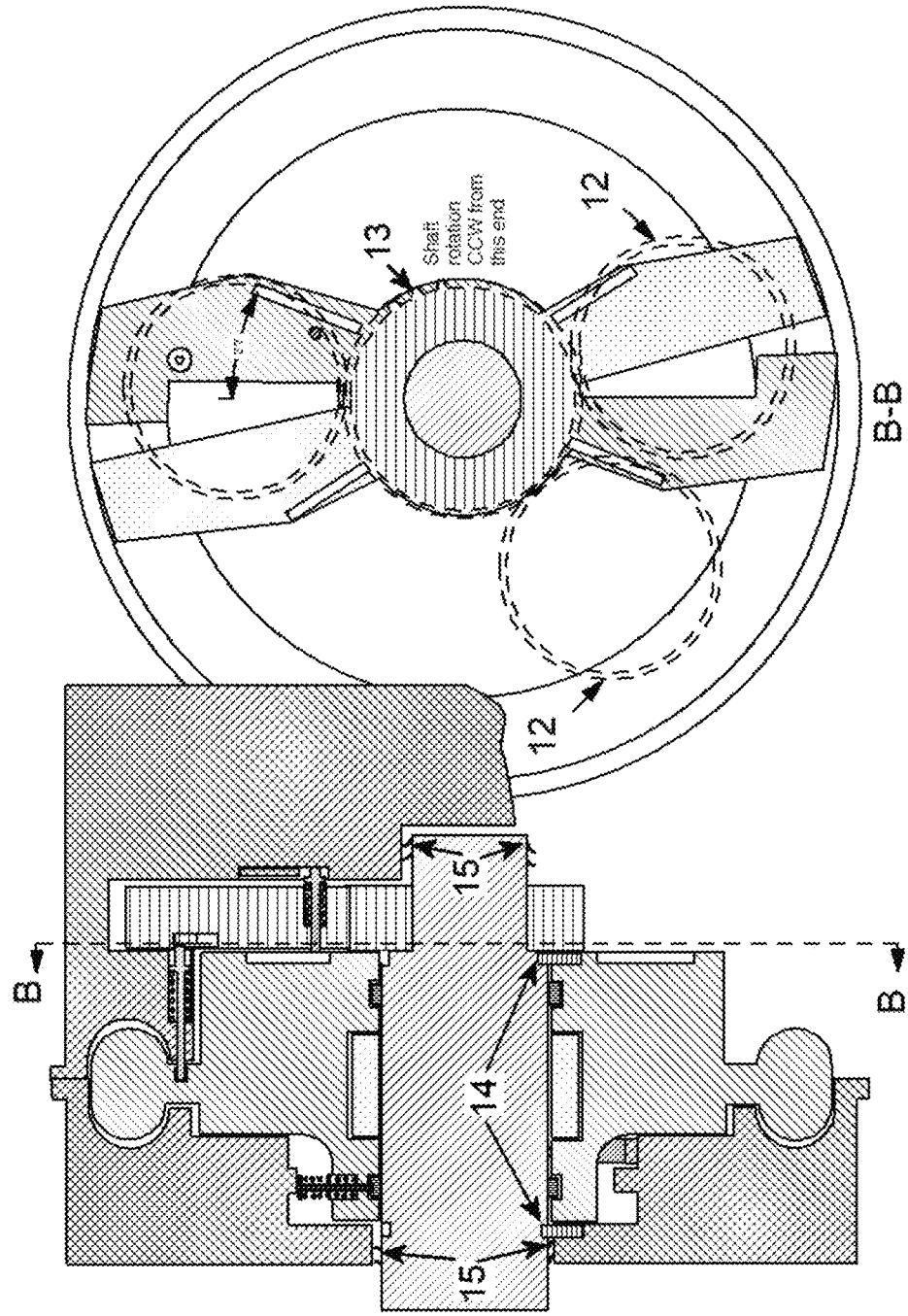
FIG. 2 shows a different longitudinal section and different cross section of the invention.

The best description of the TFICE begins with Section A-A of FIG. 1 and Section B-B of FIG. 2. There are two sets of vanes that are each essentially symmetrical across the centerline of the engine. One is termed the Power Vane (PV) and the other is the Reaction Vane (RV). These vanes are designed and assembled onto the shaft much like the hinges of a door in that the vanes share shaft space by being segmented at the shaft bore. The biggest deviation from the door hinge analogy is that the vanes continue across the shaft, each vane being a single assembly with arms and "pistons" going outward from the shaft in both directions encompassing the diameter of the engine section. There is complete symmetry of the arm surface features across the centerline as shown in Section B-B. Symmetry is lost at sections A-A and C-C since each vane has just one OCS pin assembly. The OCS pin assembly for the Reaction Vane (RV) is shown in Section C-C.

The gas working chamber is shown in FIG. 1 left view as an oval cross section and a toroid around the housing best seen in FIG. 2 Section B-B. This oval cross section is changed to a circular cross section in FIG. 3 as this would provide easier "piston" sealing. However the oval combustion section would provide easier sealing of the inner—toroid area, a more difficult sealing problem. Higher complexity of the "piston" is hinted at in FIG. 4 but is not fully developed in any drawing herein as a slot is needed for each piston to fit a tab for each vane end. FIG. 4 provides a simplified shape of the piston and provides a sketch of a possible combustion chamber as ignition is to occur. FIG. 4 acknowledges that the combustion chamber needs seal elements for the—toroid inside gap to fully close it. The seal elements and piston shown are only a first thought and serve to complete possible component design for vital functions. Somewhat standard piston rings could be needed at both ends with the combustion chamber side certainly needing more than the single ring shown. FIG. 4 shows the inside seal elements as discrete plates that are set onto the narrow opening on the inner portion of the—toroid. This opening is needed for the vanes but the opening can be narrow as internal bending of the vane arm is best resisted in the circumferential direction anyway.

The seal elements for the—toroid found in FIG. 4 are individual plates that are set out and held in place against a ledge and against each other during combustion. They are collected during exhaust. This concept presents multiple concerns and so more thought needs to be given to this problem of forming a complete chamber that expands or contracts as vanes move through various cycles. This sealing function must resist both combustion pressures and chamber vacuums during the intake cycle.

Figure 5:
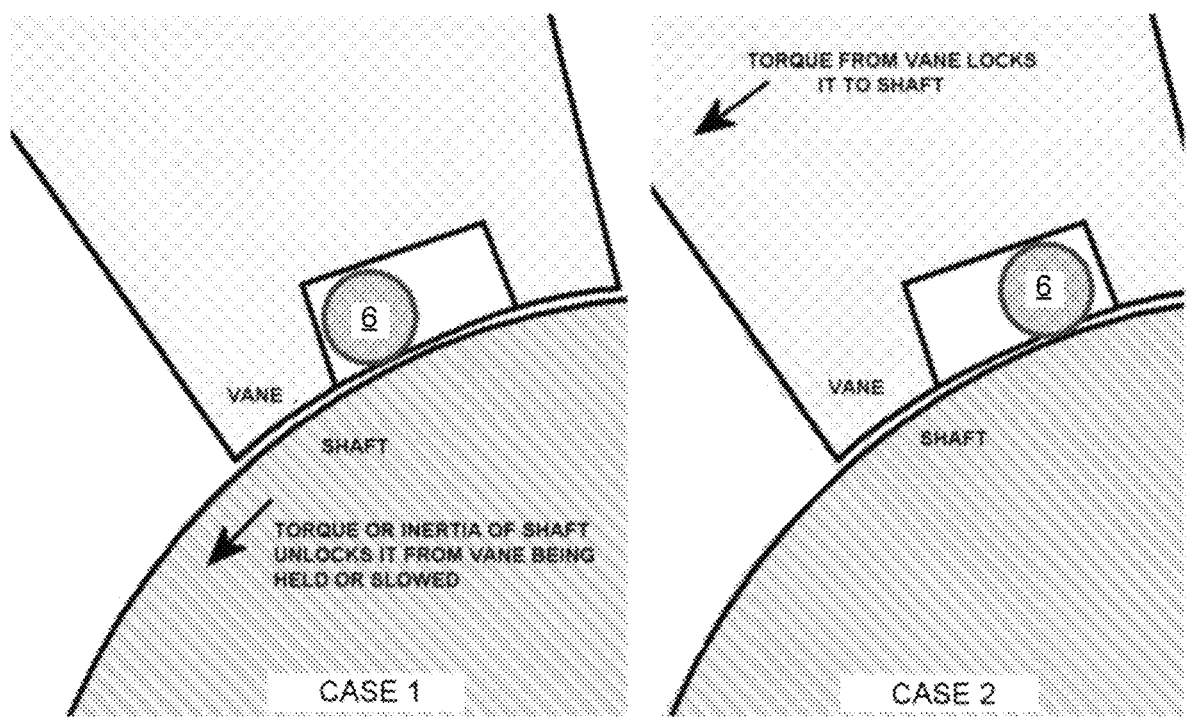
FIG. 5 shows two views of the same vane-roller element-shaft area under different loading conditions.

An Overrunning Clutch System (OCS) is integral to the operation of this engine. Vane movement must be controlled so that vanes can move fixed with the shaft, as during power transfer or for other cycles needs. At various times a vane will need controlled deceleration and then holding to the housing for fixed lengths of time. The OCS allows these events but cannot perform all above mentioned requirements. FIG. 5 shows the roller element in operation for the case of the vane being held to the housing and the case where combustion locks the vane assembly (vane plus OCS assembly) to the shaft. Besides allowing free vane motions the OCS of this invention has an additional feature that forces the roller element into the locked position, see item 8 in FIG. 1. Each vane has one pin that is controlled by item 9 (OCS ramp). The ramp is designed to move the pin into the roller element free space once the vane has fully accelerated to shaft speed.

Figure 3:
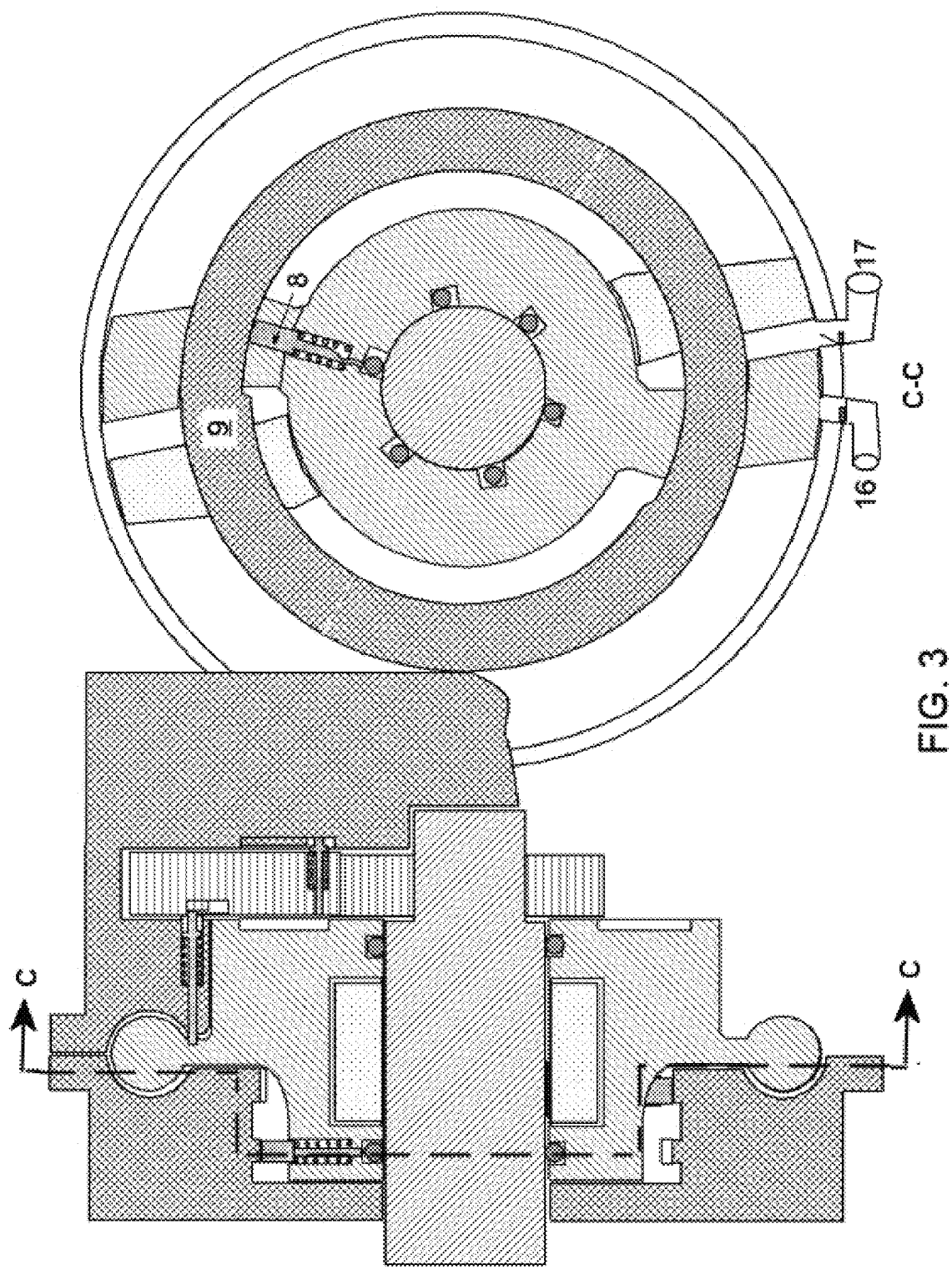
FIG. 3 shows a different longitudinal section and different cross section of the invention with a different possible combustion chamber shape than previous two figures.
Figure 4:
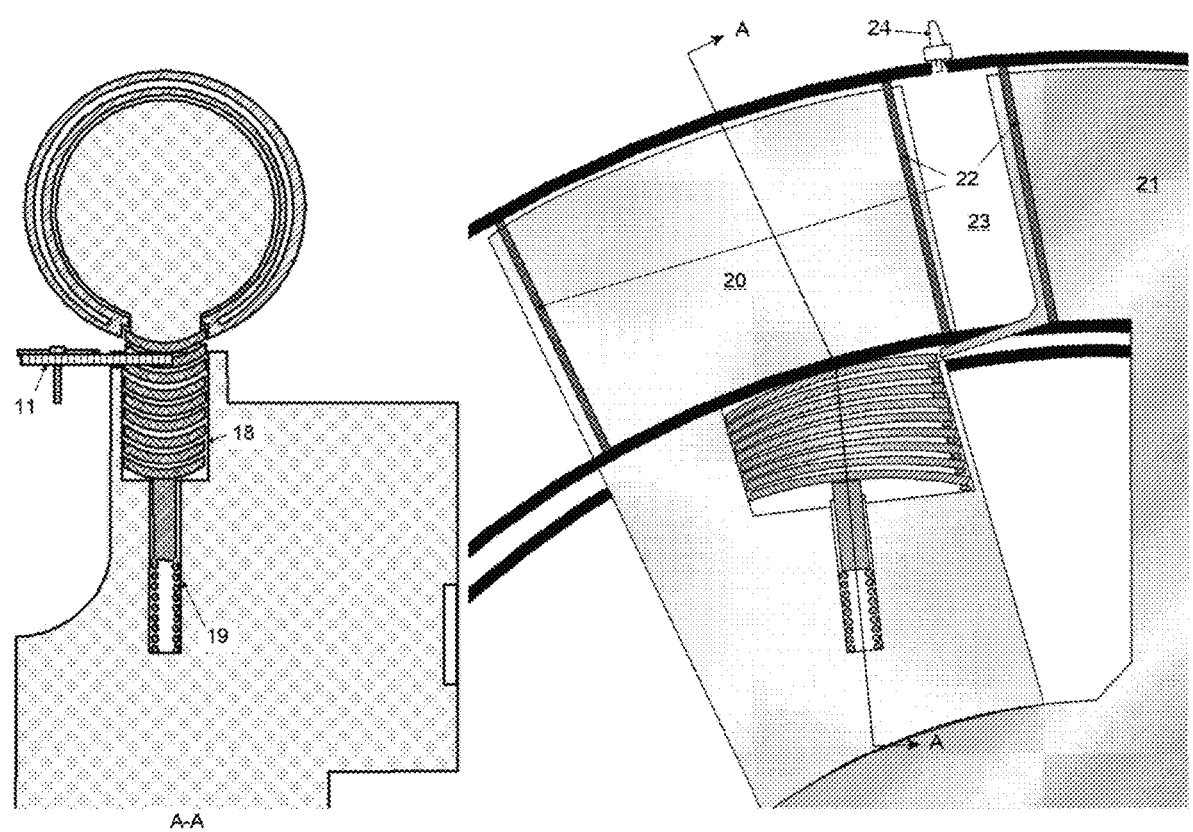
FIG. 4 shows a cross section of the combustion chamber and sealing components and a longitudinal view of same.

FIGS. 1 to 3 show the components for controlling acceleration or deceleration of the vanes. Note that the PV has no controlled acceleration; it benefits fuel efficiency that the Power Vane locks quickly to the shaft upon the start of combustion through the overrunning clutch. The Reaction Vane (RV) has controlled acceleration and deceleration through assigned gears, pins, ramps, and slots in the end of the vane for receiving the well timed pin insertion. Both PV and RV have timing gears with pins that are placed and timed so that the pin is pushed into the lower length of the vane slot, where the angular velocity of the vane's slot point is lowest and best matches that of the pin. As the timing gear rotates the pin looses angular velocity with respect to the engine centerline and thus the vane decelerates. After 90 degrees of timing gear rotation the pin angular velocity is zero with respect to the engine centerline. Thus the vane is momentarily stopped. This pin is allowed out via the ramp and spring. Coincidentally, another pin, located in the housing, (item 4) is pushed into a corresponding hole in the vane via a ramp on the gear face. Said ramp holds the pin for the prescribed time for the completion of combustion (RV being held) or exhaust (PV being held). As the PV has no controlled acceleration, this vane's angular motion is too fast compared to the cycle of controlled acceleration of the RV. Thus the PV must be held longer during exhaust to compensate and bring the two vanes into timing sync.

Figure 6:
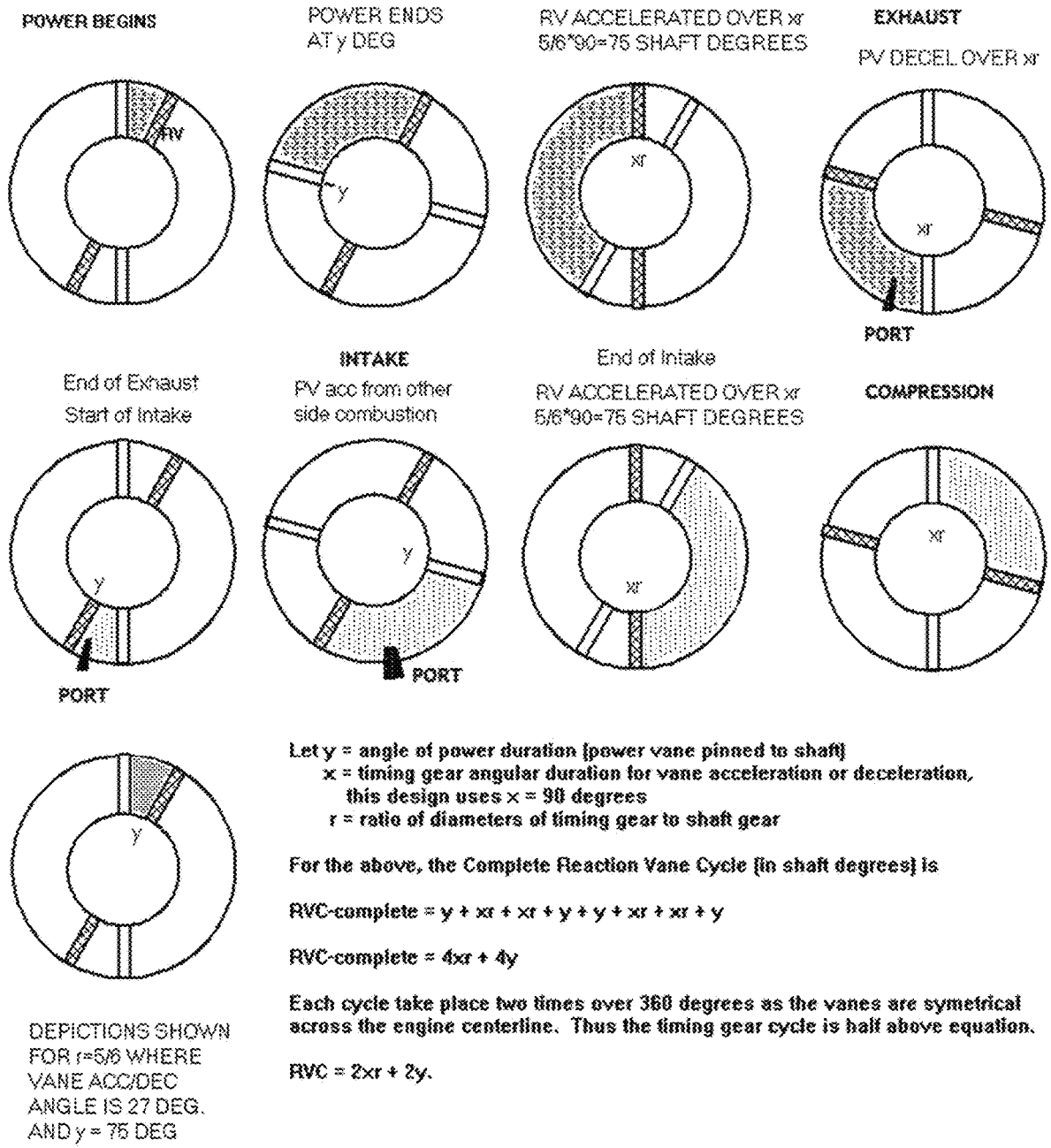
FIG. 6 depicts the operational cycles and derives the timing gear equation.
Figure 7:
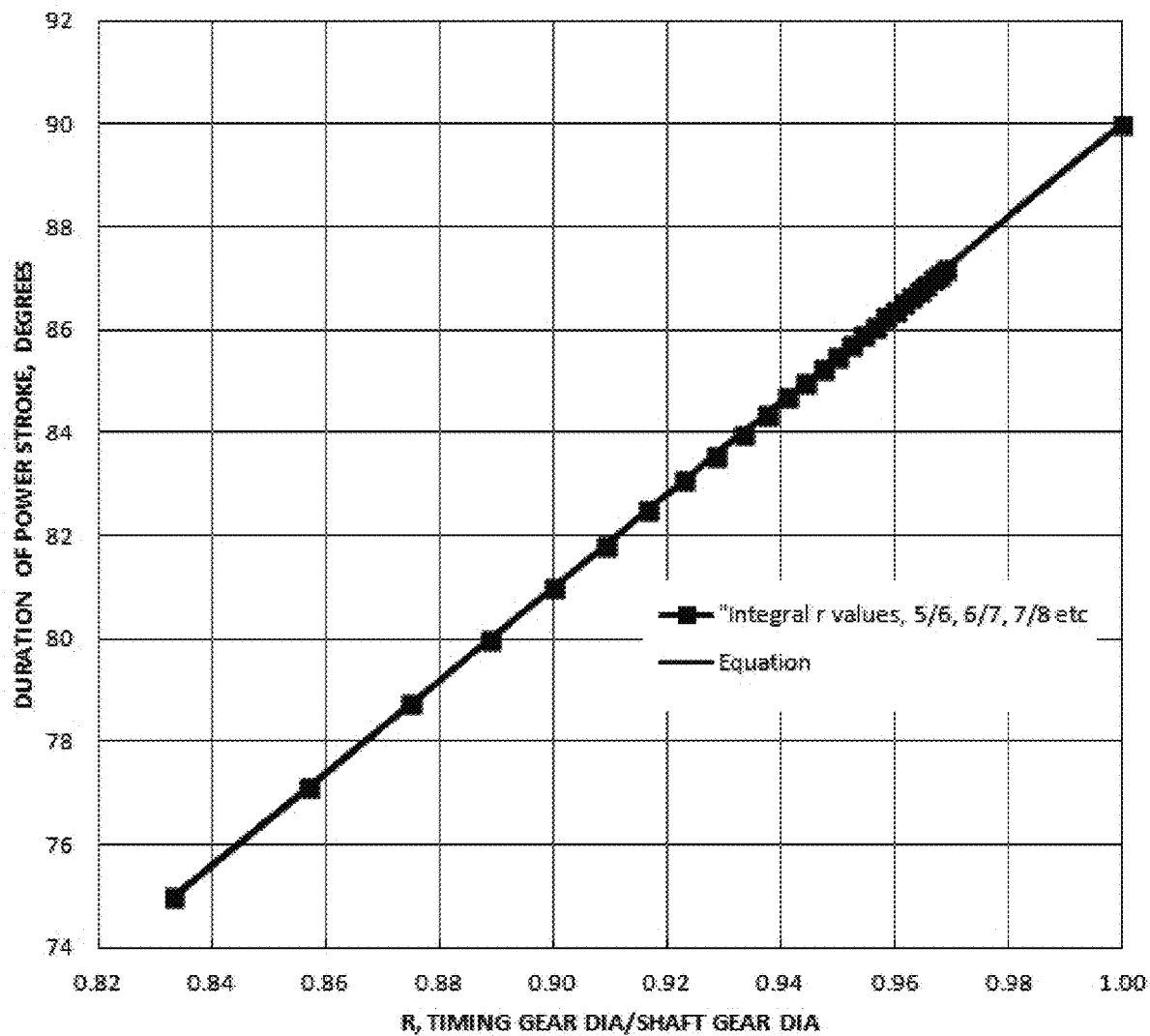
FIG. 7 plots the timing gear equation for inch sizing of gears and continuous gear sizes.

A complete development of the steady state engine operation is seen in overview in FIG. 6. The events begin in the upper left with the start of combustion. Subsequent events move to the right and the vane being fixed or moved is showed via comparison of events. It was important to develop an equation that related the length of the power "stroke" to the sizing of gears that control vane motion. This equation is developed in FIG. 6 and the ratio of shaft to timing gear sizes is plotted in FIG. 7. FIG. 7 was derived from inputting fixed inch diameter gears (easily obtainable) in simple ratios. This simple gearing serves to make a prototype easier but a developed engine would likely have gearing that varies by a single or a few teeth between the shaft gear and timing gear.

The present invention will need proper sizing and metallurgy of the shaft and OCS components for adequate life against contact fatigue. It's thought that the detail design will incorporate pressing together 180 degree sectional assemblies containing the OCS mechanism while bolting together vane halves, akin to crushing a rod bearing on the conrod assembly. Hardened (or surface hardened) shafts, roller elements, and OCS housing will be needed. Assembly of the shaft, vanes, and OCS subassembly will need to be done outside the housing. There will need to be temporary means of holding roller pin elements, perhaps grease that could be flushed before running. Toroidal shaped "pistons" could be fitted that are slotted to accept the fitting of vane ends that are essentially tabs. A slip fit attachment of the piston assembly to the vane is thought necessary to prevent piston seizure with thermal growth of the vanes. This engine will bring new thought patterns to the details of component design and assembly. The most basic principles of good engine design will still apply but in unique ways. It cannot be the goal of this first patent to foresee and design in detail for all possibilities.

This TFICE engine will need a strategy for starting since designed steady state operation relies on combustion alone for movement of the PV for a small portion of its travel. Detailed drawings have not been made but the thought process is to have a starter motor that turns the shaft and another starting only system that moves the Power Vane via a pin in slot similar to that of the three acceleration/deceleration mechanisms. Alternatively the PV could be moved via linear actuator to put it on the ramp of the OCS pin prior to turning the shaft.

There is a possible concern with the PV loosing timing as it has a portion of its cycle left uncoupled and relying on combustion to lock it to the shaft. In realty this portion does not need to exist for any significant length as inserting the OCS pin in a timed manner with the start of ignition should be possible. Thus each change of event would be controlled essentially by the shaft and then starting could be in the usual manner. The changeover from being held to full shaft motion at ignition is a concern as it has no acceleration control. Good materials for contact stress (carburized shaft and roller element housing, 52100 pins) and a minimum of excess clearance should provide adequate life. This changeover during starting will be using a low speed, low torque starter motor and so should be less concern. Overlap of a hold and move mechanism occurring coincidentally could be a possibility depending on tolerances, this must be considered in every case. As a safety the various pins could have a tapered end design and/or chamfered holes that prevent pin breakage at maximum material conditions.

Other mechanisms for safety, cooling, lubrication, other sealing functions, fuel and air mixture and delivery, ignition and noise suppression are generally not shown since standard design methodology can be applied. Additional features for facilitating assembly (ie ports and covers) are generally not shown. Fasteners have not been generally shown for this patent but should follow good Engineering practices.

The present application does not allow for unequal length cycles (i.e. Atkinson cycle equivalent). However the concept of an Atkinson cycle applied to a TFICE type engine could have huge efficiency benefit gains, perhaps more than that provided to piston engines. It is conceptual that a near 360 degree "tangential force power stroke" is possible but the current limitation is ability to seal the inside of the—toroid chamber over those angles.

DETAILED DESCRIPTION OF DRAWINGS

Reference FIG. 1 for following major components:
1. Items (1), housing sections, a multiple piece design with the major two halves bolted around the circumference. The bolted housing assembly leaves an inner gap. Bore for the shaft (7) is precisely aligned, round and straight. This housing locates the shaft, three timing gears, two item (4) hold pins, a precisely located toroid (but shown with an oval section FIG. 1) which forms part of the combustion chamber, and multiple hold springs for the combustion chamber seal plates (not shown above). Circular based ramps controlling items (9) are located in one end of this housing.
2. Item (2), Power Vane (PV), is located on the shaft via items (6), roller elements, of which twelve are shown above for the PV. Another 12 of item (6) are not shown in FIG. 1 but are utilized to locate item (10), Reaction Vane, on the shaft. The PV fits mostly inside the RV and both vanes are fitted on the shaft like a door hinge. Unlike a door hinge both vanes continue across the shaft in a symmetrical fashion. Note that the gas working chamber is circular in cross-section in later figures, which is preferred to aid sealing.
3. Item (3), timing gear, is located on a shaft (not shown) bolted into (1). This timing gear contains a ramp to control item (4) hold pin and item (5) pin assembly that controls acceleration of the RV.
4. Item (4), hold pin assembly, is located in the housing. When the PV has slowed to zero velocity, the gear ramp pushes and holds this pin further across the housing and into a corresponding hole in the PV. (Note that the length of the vane where the pin enters is proportioned longer in a future figure as that provides for sealing functions).
5. Item (5), pin assembly, is located in the timing gear and is controlled by a ramp in the housing. The ramp is adjacent to the gear face, on the same centerline, and at the same fixed radius as the gear pin. This ramp controls the axial position of the pin as the gear turns and, at the proper time, the pin is pushed into the RV or PV slot and slows the RV or PV from max velocity to zero as the appropriate timing gear turns 90 degrees. Each of three timing gears has this pin assembly for acceleration or deceleration of its respective Power Vane or Reaction Vane. Starting the motion of a stopped vane uses the 90 degree timing gear location for the put-in point of the pin into the vane slot. As the timing gear (item 3) rotates the pin angular motion with respect to the engine centerline changes from zero velocity at 90 degrees to maximum angular velocity when the pin is nearest the center gear, at zero degrees of the timing gear. Alternatively, this design uses the zero degree locations of two other timing gears as the put-in points of those pins into the PV or RV to slow those vanes from maximum velocity to zero. The exact angular location of the ramps starts and stops are critical for smooth insertion and removal of the pins. Pin design with tapered ends may be needed to allow for smooth transitions between different vane control mechanisms over the full cycle.
6. Items (6), overrunning clutch roller elements, are located in the PV and Reaction Vane (RV). Details of item 6 are shown in a later figure. Precise geometry of this Overrunning Clutch System (OCS) is needed as it allows the vanes to either be held to the housing or be locked with the shaft. The OCS consists of a multitude of roller elements, either ball or needle rollers. Each is located in a hole or slot with precise geometry and one roller element in each vane can be locked between the shaft and vane by application of the pin of item (9).
7. Item (7), shaft, is located in a precise bore in the housing. The RV and PV are precisely located on it thru item (6) OCS. A shaft gear is bolted on one end to drive the three timing gears. Two locating plates and two sets of seals are used on the ends, per typical practice. Power is taken off the left end in FIG. 1.
8. Item (8), OCS pin assembly, one is located in each vane. This pin is controlled by item (9) and the pin acts to push the OCS roller element into a locked position when item (9) dictates.
9. Item (9), OCS ramp, is a circular multi-ramped cam that actuates the OCS pin over strategic portions of its 360 degrees. There is one OCS for each of the two vanes. Long movements of the RV are via actuation of the OCS pin via this ramp. The PV will drive the shaft with the start of combustion thru the OCS roller elements before its corresponding OCS ramp is activated. Activation of this OCS ramp for the PV shortly after combustion is part of a strategy to aid the starting procedure.
10. Item (10), Reaction Vane, is similar to the PV with one essential exception. The RV has two timing gears and associated mechanisms. The RV requires an acceleration timing gear and pin assemblies that is not used with the PV. Since the PV has no acceleration timing gear its hold time must account for this faster response by increasing the PV hold time as defined in a later figure.
11. Item (11) is a spring mechanism to hold individual sealing elements against the open rim of the toroid chamber Reference FIG. 2 for the following:
1. Items (12) are two timing gears shown as dashed circles in the right side only of FIG. 2. These gears control RV or PV deceleration. Each timing gear is in mesh only with the shaft gear.
2. Item (3) timing gear serves to accelerate the RV from a fixed position to a position where the item (8) OCS pin assembly can take over control of vane movement. Vane acceleration is accomplished when the gear rotates the pin end onto the housing ramp and thus pushes the item (5) pin into the RV slot at the 90 degree mark (this mark is to the right of the "27" degree angular measurement shown on FIG. 2). There the pin has zero angular rotation wrt the engine shaft. Coincidentally the item (4) hold pin is released. After 90 degrees of timing gear rotation the angular acceleration is essentially the same as the shaft. At that point the ramp allows the pin assembly to move out of the vane slot and coincidentally the hold pin mechanism is inserted to hold the RV for a specified length of rotation.

Note that the PV gear will theoretically need to hold an extra 90(5/6)−27=48 degrees since the RV moves 27 degrees during its gear-controlled acceleration as the shaft moves 90 degrees (with this particular 5:6 ratio of timing gear to shaft gear). This movement during its acceleration lets the RV get ahead of the PV from cycle to cycle. There is an assumed instantaneous acceleration of the PV from combustion.

3. Item (13) is a shaft gear that turns CCW in the right side view of FIG. 2.
4. Item (14) are location plates to define axial position of the shaft.
5. Item (15) are seal elements, typical for shafts running in housings containing oil.

Reference FIG. 3 for the following:
1. Item (8) OCS pin assembly and item (9) OCS ramp are shown for the RV. Note that the start of the ramp which clamps the RV and shaft together is separated from the hold position by the angular distance of the timing gear acceleration mechanism. This angular distance was shown to be 27 degrees in FIG. 2 (for shown gear ratio). The end of this ramp occurs at the point where the deceleration gear pin is first inserted (27 degrees prior to the hold point).
2. Item (16) is an exhaust port with a one way valve.
3. Item (17) is an intake port with a one way valve. The PV contains rings on each end to prevent mixing, shown in a later drawing.

Reference FIG. 4 for the following:
1. Item (18), seals, consist of a multitude of inner seal plate elements in this iteration of the engine. Each plate element has a single or compound bend. Ends are angled to fit into each other. Plates are spring steel and fit into the housing annulus. An end tang is located at one end to facilitate locating each element against the other or initial chamber seal. Seals close the inner gap of the gas working chamber. Items (11), springs, are screwed into the housing at the introduction point of the each seal element. Locations correspond to initial placement of seal elements within the combustion chamber and at corresponding spacings in the exhaust, intake, and compression chamber locations.
2. Item (19) is a spring assembly that pushes seal elements into the seal area. Items (18) and (19) are used two times in the PV symmetrically across the engine centerline.
3. Item 20 is the piston assembly attached to the PV. It is one of two piston assemblies that are attached to the PV. The same piston assembly is fitted on the other end of the PV.
4. Item 21 is one of two piston assemblies that are attached to the RV. The same piston assembly is fitted on the other end of the RV.
5. Items 22 are piston rings.
6. Item 23 is the gas working chamber which is a portion of the toroid closed and sealed by items 18, 20, 21, and 22. Note that the gas working chamber is circular in cross-section in this figure but may be oblong as has been shown previously.
7. Item 24 is a conventional spark plug with a recessed gap to allow free piston movement.

Reference FIG. 5 for the following:
1. Items 6, roller elements, are shown in operation for two cases: 1. where the vane is not making torque and 2. the case where the vane is making torque.

Reference FIG. 6 for the description of various events and the corresponding gas working chamber locations which are shaded.

Reference FIG. 7 which is a graph of the calculated gear ratios and the duration of the "power stroke" which is the designed angular duration of the power vane as it singularly drives the shaft with tangential force during combustion. Steady State Operation Cycle Steady state operation is shown in FIG. 6 and the equation developed in this figure follows:

$$RVC=2xr+2y \qquad \text{Eqn 1.}$$

Where
RVC is the Reaction Vane Cycle, measured in shaft degrees.
x=angle of timing gear to decelerate or accelerate a vane. In this invention x=90 degrees
r=Timing Gear Dia./Shaft Gear Dia.
y=Angular duration of the PV during combustion as it singularly drives the shaft with tangential torque $$r=RVC/360 \text{ (this follows from the definition of } r\text{)} \qquad \text{Eqn 2.}$$

Thus for the designs depicted in the present invention:

$$360r=180r+2y$$

$$y=90r \qquad \text{Eqn 3.}$$

Equation 3 is plotted in FIG. 7. It relates gear sizes to the angular locations where hold/move transitions begin.

The designs depicted herein utilize a single shaft gear and three timing gears driven directly from said shaft gear. No intermediate gears are shown but these could be useful to limit the angular displacement of the vanes during acceleration or deceleration.

REFERENCES

1. Overrunning Roller Clutch, Dietrich Reister Herzgenaurach and Wolfgang Pfluenger, Industiewerk Schaeffler, Herzodenauwach, Germany, U.S. Pat. No. 3,537,555
2. Rotary Piston Engine, Tatsuya Kita, Mazda Motor Co. Hiroshima Jp. U.S. Pat. No. 4,926,816
3. Improvements relating to the propulsion of aircraft and other vehicles, British patent no. 347206, filed 16 Jan. 1930

What is claimed is:
1. An internal combustion engine comprising:
a toroid in a housing, said housing is a multiple piece design with the major halves bolted together around the circumference to form said toroid which has an inner gap and;
two gas working chambers formed by portions of said toroid, two sets of piston assemblies with each piston oppositely facing the other inside said toroid, and seals at the inner gap of said toroid portion and;

a power vane which connects said piston assembly at each end of said power vane and;

a reaction vane which connects other said piston assembly at each end of the reaction vane and;

said vanes and piston assemblies are symmetrical across the centerline of the shaft such that each end of each vane has a piston assembly attached such that the engine has four piston assemblies in total and;

a shaft from which useful power can be taken at one or both ends and said shaft is connected to each vane via an Overrunning Clutch System (OCS) whereby free vane motions with respect to the shaft are allowed and;

said vanes are designed to be assembled onto said shaft in a manner of door hinges so that power and reaction vanes alternately share shaft length via the OCS and;

said vanes each has a portion extending to at least one side of the engine and;

said OCS forces a multitude of roller elements into locked positions with the shaft during combustion and gas expansion so that the power vane can create torque on the shaft and;

an OCS pin assembly located within each vane and an associated OCS ramp that combine to force a finger into the roller element clearance volume and thus locking said vane to the shaft over strategic portions of its 360 degrees and;

a group consisting of a timing gear, pin assembly, ramp, and a slot in the reaction vane for the controlled acceleration of said reaction vane from a stopped position as the ramp forces a pin within the gear into a slot in the vane at the pin's 90 degree gear angle having where the pin's angular rotation with respect to the engine centerline is zero and timing gear rotation then accelerates the pin and vane for 90 degrees of timing gear rotation whereupon the pin is allowed out of the vane slot via said ramp and a spring in said pin assembly and;

two groups of timing gears, pin assemblies, ramps, and slots in both the reaction and power vanes timed to decelerate each vane via forcing a pin within said timing gear into a slot in each vane at the pin's zero degree gear angle position nearest the engine centerline to initiate deceleration and after 90 degrees of timing gear rotation said pin has zero angular velocity with respect to the engine centerline and said ramp and spring allow said pin to come out of the vane slot and;

a hold pin assembly contained in said housing is pushed into a hole in the vane via a ramp on the gear face with precise timing coinciding with the removal of earlier said pin that had brought the vane to a stop and;

said ramp in gear face pushes hold pin into said hole in the vane for the prescribed time for completion of the event being considered, i.e. combustion (RV being held) or exhaust (PV being held) and;

the four engine cycles occur via holding the appropriate piston assembly and moving or allowing movement of the other piston for calculated durations and;

an exhaust port placed in the housing that is uncovered by the PV piston assembly position after a calculated combustion duration and said port may have a one way flow valve to allow only the escape of combustion gases and;

an intake port placed in the housing that is uncovered by the PV piston assembly after the full exhaust event has completed and vanes movement of both PV and RV movements across and;

an exhaust cycle is accomplished via slowing and holding the PV and movement of the RV such that said exhaust port is available to expel combustion gases in the gas working chamber and;

an intake cycle is accomplished via the movement and then holding of the PV and movement of the RV such that said intake port is available to the gas working chamber and;

a compression cycle is accomplished via movement and holding of the PV and movement of said RV to produce convention compression ratios.

2. The engine of claim 1 with essentially an oval or oblong toroid and piston cross section.

3. The engine of claim 1 having unequal length engine cycles (i.e. an Atkinson cycle engine) such that the power cycle occurs over significantly longer duration (conventionally known as 'Power Stroke') compared to the other cycles via recalculation of said gear sizes and gear placement and also repositioning said intake and exhaust ports.

4. The engine of claim 1 having a timing gear, pin assembly, ramp, and said slot in the power vane for the controlled acceleration of the power vane whereby the ramp is normally positioned away from the pin except during engine start-up and shutdown and; during engine start-up and shutdown a linear actuator pushes said ramp into contact with said pin and; an OCS ramp portion is moved into place via a linear actuator during engine start-up and shutdown such that said portion of ramp forces a finger into the roller element clearance volume thus locking the power vane to the shaft over the normal power portion of said power vain when the engine has been keyed on or off.

\* \* \* \* \*